United States Patent Office 3,578,485
Patented May 11, 1971

3,578,485
METHOD OF PRODUCING A COATED PAPER
Saburo Imoto, Sakazu Kurashiki-shi, Kyoichiro Ikari, Yasue Kurashiki-shi, and Tatsuaki Hattori, Sakazu Kurashiki-shi, Japan, assignors to Kuraray Co., Ltd., Sakazu, Kurashiki-shi, Japan
No Drawing. Filed July 26, 1968, Ser. No. 747,797
Claims priority, application Japan, Aug. 3, 1967, 42/50,241
Int. Cl. B44d 1/44
U.S. Cl. 117—62
10 Claims

ABSTRACT OF THE DISCLOSURE

A process for producing a coated, paper, having improved water-resistance and superior printability characterized by treating the coated surface of a paper coated with a color composition containing as the principal constituent a pigment and a polyvinyl alcohol with a solution containing a boric compound having an electron accepting structure selected from the group consisting of boric acid and boric salts, a water-soluble amino compound having one or more of primary, secondary, tertiary or quaternary amino groups in its molecule, an electron donating structure and a boiling point in excess of about 100° C., and a surface active agent which reduces the surface tension of the treating solution.

---

The present invention relates to a method of producing a coated paper and has as one of its objects prevention of the coated layer from sticking to a calender roll, whereby a coated paper with improved water-resistance and superior printability can be produced.

A conventional method known in the art of applying a coating color, e.g. one comprising a mineral pigment such as the known siliceous pigments including clay, kaolinite, silica and the like, to a paperboard and imparting a glossy surface to the coated side without reducing the thickness of the paperboard to any extent, has been a water treatment process including wetting the coated surface prior to calendering to render the coated layer fluid. This water treatment process, which receives a web having been coated, dried and heated up to approximately 100° C., is always kept between 60 and 70° C. during the commercial continuous operation. Accordingly, when the coating color incorporates a thermoplastic water-soluble binder such as polyvinyl alcohol (referred to as PVA hereafter) and the like, there exists a disadvantage in that the coated surface tends to stick to the calender roll in the above-mentioned water treatment process. Currently, in order to prevent the coated surface from adhering to the calender roll, an aqueous solution of borax or boric acid is used in the water treatment process when PVA is incorporated into the coating formulation. This treatment has, however, not been satisfactorily effective. Also, the addition of borax or boric acid alone is not necessarily capable of imparting adequate waterproofness to the coated paper of PVA type, nor can the use of such pigments as kaolinite clays or sericite clays in the wet process as a principal composition of the coating color provide the coated paper with desirable offset printing properties.

The present invention is intended to eliminate these shortcomings, and concerns a method of producing a coated paper characterized by treating a paper coated with a coating color consisting of mineral pigments and PVA, or its derivatives, as principal compositions with a treating liquid comprising boric acid or a boric salt, a water-soluble amino compound having one or more of primary, secondary, tertiary or quaternary amino groups in its molecule and having a boiling point of over 100° C. and asurface active agent. The method embodied in the present invention serves to prevent thec oated surface from sticking to the calender roll, enabling the coated paper to exhibit enhanced water-resistance as well as excellent offset printability.

Boric salts which can be employed in the treating liquid of this invention include those having an electron-accepting structure, for instance, borax and the like such as various of the other known inorganic borates, e.g. other sodium or alkali or alkaline earth metal borates. The said water-soluble amino compounds having amino groups therein, useful in this invention, are those having an electron donating structure and a boiling point of more than 100° C. Various amino compounds are known to have an electron donating structure including amino compounds with primary, secondary, tertiary and/or quaternary amino groups, including mono-, di- and tri-amines $(R)_3N$ where one or two R's can be hydrogen and one to three R's can independently be, for example, alkyl, e.g., lower alkyl having between about 3 and 8 carbon atoms or higher alkyl (i.e., fatty amines where R has up to about 22 carbon atoms), lower alkoxy where R has between about 2 and 8 carbon atoms, particularly monoalkoxy; diamines such as lower alklenediamines, i.e. of about 2 to 8 carbon atoms; urea and its salts; iminourea salts; hexamethylenetetramine; quaternary ammonium salts including the chlorides and sulfates, etc. Exemplary compounds are, for instance, triethanolamine, hexamethylenediamine, hexamethylenetetramine, dicyandiamide, urea, ethylenediamine, dipropylamine, etc. In practice, the amino compounds can be used alone or mixures of such compounds can be effectively used. When these compounds are utilized together with the boric acid or boric salt, unpaired electrons belonging to the nitrogen atoms of the amino compounds (electron donating structure) effect a coordination bonding with the electron-accepting boric acid or the boron atom of the boric salt. Accordingly, the surface of the PVA-type coated paper treated with such a mixture will be covered with an amino compound having its amino groups, cordination-bonded with boron and thereby the water absorbency of the coated surface is reduced and its offset printing properties are improved. A PVA-type coated surface treated with a boric acid or borax without the addition of amino compounds proves to be unsuitable due to excessive water absorbency for offset impression and of insufficient water-resistance quality. As mentioned, in addition to the electron donating structure, the boiling point of the compounds with amino groups referred to above in the present invention is to be in excess of 100° C. lest they should evaporate and escape in the course of the treating process. Furthermore, the surface active agent to be added to the treating liquid can be any such agent which acts to reduce the surface tension of the said treating liquid, thereby making it possible to apply the treating liquid evenly over the coated surface. Preferably, such a surface active agent functions to render the said coated surface hydrophobic. For this purpose, most surface active agents are effective.

In general, the surface-active agents suitable for use in this invention can be anionic, nonionic or cationic. The water-soluble portion of the various kinds of surface-active agents differentiates the types from each other. In anionics, the water-soluble portion is an anionic radical such as a sulfonic or a carboxylic acid group. In cationics, the water-soluble group is almost always an amine radical of some type, although phosphorus and sulfur can sometimes be substituted for nitrogen to form phosphonium or sulfonium compounds. In the nonionics, the water-soluble portion is generally a polyhydric alcohol such as glycerol, sorbitol, polyethylene glycol or the like. Sometimes amides may be employed. In general, the water-solubility of the nonionics depends on the number of oxygen or nitrogen atoms associated with one end of the molecule.

Examples of suitable cationic materials for purposes of this invention are amines such as diamines such as those having the formula $RNH(CH_3)_3NH_2$ in which R represents predominantly saturated hydrocarbon radicals containing from sixteen to eighteen carbon atoms. Cationics include the quaternary amines such as methyl dodecyl benzyl trimethyl ammonium chloride. Examples of an-ionics are the fatty acids such as lauric or stearic acids, the sulfonates such as sulfonated castor oil or the sulfates such as the sulfate of oleyl alcohol, particularly the alkylated and alkylated aromatic sulfonates such as sodium octyl naphthalene sulfonate. One type of nonionic surface-active agents consists of the fatty acid esters of polyhydric alcohols such as polyoxyethylene sorbitol tetraoleate containing about six mols of ethylene oxide per mol of sorbitol. Another type of oil-soluble nonionic consists of the ester free ethers of high molecular weight alcohols with polyhydric alcohols. An example of this type of material is polyoxyethylene lauryl alcohols containing about five ethylene oxide groups in the polyethylene glycol radical.

In general, the amounts of the components in the treating solution can vary widely. A most efficient mix ratio of the three components used to form the treating solution of the present invention is for about each 5 parts by weight of boric acid or boric salt, about 1 to 10 parts by weight of the water-soluble compound containing amino groups and having a boiling point of higher than about 100° C., and about 0.001 to 1 part by weight of the surface active agent. The treating agents are applied as an aqueous solution generally containing about 0.5% to 10% boric acid or boric salt, preferably about 5 weight percent.

The treating solution used in the present invention can also be applied to impart water-resistance to a wide variety of coated papers such as the said PVA-type coated paper, art paper and others, and in order to better offset printing properties as well. The coating color compositions used in preparing the coated paper to be treated in accordance with this invention are those known to the art and in general include a pigment and PVA or a derivative thereof, and, if desired, additional components such as latices.

PVA's useful in such coating color compositions include completely saponified PVA, partially saponified PVA or copolymers or PVA with other unsaturated, polymerizable monomers for instance, vinyl ether, allyl alcohol, etc. The PVA may be added to the pigment as a solution in water and the concentration of PVA in the composition may vary depending upon the particular degree of polymerization of the PVA but conventional, e.g. minor concentrations, such as about 1 to 25%, preferably about 5 to 20% by weight based on total solids are generally preferred. PVA derivatives are also used in the coating composition applied to paper to be treated according to this invention. Such PVA derivatives include those formed by introducing another hydrophilic group such as carboxyl, sulfonyl, phosphoryl, pyrrolidyl groups or the like, or hydrophobic groups such as lauryl, and octyl groups into PVA using acrylic acid, crotonic acid, isocrotonic acid, maleic acid, vinyl sulfonate, vinyl pyrrolidone, vinyl lauryl ether and the like. Latexes which can be used in minor amounts in the coating color solution include styrene-butadiene, methyl methacrylate-butadiene, ethylene-vinyl acetate, acrylic acid ester, and vinyl acetate. Where desired, the coating color solution may contain suitable amounts of melamine formaldehyde resin, glyoxal or the like which are water resisting agents for PVA's and PVA derivatives, in addition to a pigment, PVA or a derivative thereof, and a latex. The pigment of the color composition in this invention is generally the major component of the solids and is of the type ordinarily used in paper coating. Illustrative pigments are various siliceous materials such as clay, kaolinite, silica and the like, and especially inorganic oxides. The amount of pigment can vary but most advantageously is at least about twice the amount of PVA and may be up to about 15 to 25, or more, times by weight of the amount of PVA.

The present invention is illustrated by the following examples, which, however, should not be interpreted as limiting the scope of this invention. In all the following examples, the percentages given are by weight.

EXAMPLE 1

A coating color composition containing 40% solid content was prepared by adding with adequate agitation 6 parts by dry weight of a 20% aqueous solution of PVA (degree of polymerization 550 and degree of saponification 98.5 mol percent) and 9 parts based on solid content of a styrene-butadiene copolymer latex to a 70% slurry having been prepared from 100 parts of clay dispersed in water.

The resulting coating color was applied to a paperboard at the rate of 15 grams of solids per square meter. After it was dried at 100° C. for two minutes, the paperboard was further coated with each of the following six treating solutions at the rate of 16 g./m.² and was air-dried. The samples thus prepared, having been conditioned overnight at 20° C. and 65% relative humidity, were tested to determine their waterproofness and offset printability for the purpose of comparing the effects of the treating solutions. The results are set forth in Table 1.

The compositions of the treating solutions examined were:

(A) 5% aqueous solution of $Na_2B_4O_7 \cdot 10H_2O$.
(B) An aqueous solution of 5% $Na_2B_4O_7 \cdot 10H_2O$ and 0.5% Nissan Cation BB (a cationic surface active agent marketed by Nippon Oils and Fats Co. Ltd.; constitutional formula

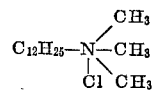

(C) An aqueous solution of 5% $Na_2B_4O_7 \cdot 10H_2O$, 5% ethylenediamine and 0.5% Nissan Cation BB.
(D) An aqueous solution of 5% $Na_2B_4O_7 \cdot 10H_2O$, 5% hexamethylenetetramine, and 0.5% Nissan Cation BB.
(E) An aqueous solution of 5% $Na_2B_4O_7 \cdot 10H_2O$, 5% urea, and 0.5% Nissan Cation BB.
(F) An aqueous solution of 5% $Na_2B_4O_7 \cdot 10H_2O$, 5% dicyandiamine, and 0.5% Nissan Cation BB.

TABLE 1

| Treating liquid No.: | Wet rub resistance (Note 1) 25° C. | Wet rub resistance (Note 1) 60° C. | Offset Printability (Note 2) |
|---|---|---|---|
| A (for comparison) | 6 | 3 | Passable. |
| B (for comparison) | 6 | 3 | Excellent. |
| C (this invention) | 6 | 4 | Do. |
| D (this invention) | 6 | 4.5 | Do. |
| E (this invention) | 6 | 4.5 | Do. |
| F (this invention) | 6 | 4.5 | Do. |
| Water treatment only | 2 | 1 | Good. |

NOTE 1.—The wet rub resistance at 25° C. was determined by placing sample sheet on a given black paper, applying one of the treating liquid with a fingertip and, after leaving the sample as it was for a minute, rubbing the surface thereof five times with an index finger to produce white, cloudy stains on the black paper, the degree of which was graded from 1 to 7. Correspondingly, the wet rub resistance at 60° C. was determined by placing on the black paper the coated sample having been dipped for 30 seconds in the treating liquid heated up to 60° C. and immediately rubbing at a fingertip to produce white stains, the degree of which was likewise graded from 1 to 7. The larger the number, the better is the waterproofness. Accordingly, 1 is interpreted as expressing the poorest waterproofness and 7 as the most superior waterproofness.

NOTE 2.—The offset printing properties were jointly evaluated by the following testing methods A and B. Method A was for visually judging the printability in terms of ink receptivity by spilling 0.g cc. of an etching solution over the coated surface and immediately solid-printing the said coated paper at a printing pressure of 100 kilograms with one gram of Snap Dry light indigo ink supplied by Dai Nippon Printing Ink Manufacturing Company. Method B, on the other hand, was for the purpose of printing the samples with Snap Dry Hi-ZF 59 Indigo ink by the same supplier and evaluating by observing the degree of the destruction brought about to the printed surface by pouring drops of water thereto and wiping them off two minutes, five minutes and ten minutes later. The results given in Table 1 indicate that the coated paper treated with the treating liquid C, D, E or F is improved with respect to waterproofness and offset printability.

EXAMPLE 2

A coating color having 41% solid content was prepared by adding, with vigorous agitation, 9 parts by dry weight of a 20% aqueous solution of PVA (degree of polymerization 550 and degree of saponification 88 mol percent) to a 70% slurry prepared from 100 parts of clay dispersed in water.

A paperboard was coated with the resulting coating color at the rate of 15 grams of solids per square meter, was again coated with each of the following four types of treating solutions at the rate of 16 grams per square meter at the end of two minutes' drying at 100° C., and was air-dried to be super-calendered. Subsequently, the samples thus prepared were conditioned overnight at 20° C. and 65% relative humidity to determine the waterproofness and the offset printability of the coated paper and compare the effect of each treating solution. The results are set forth in Table 2.

The compositions of the treating solutions examined were:

(A) 5% aqueous solution of $Na_2B_4O_7 \cdot 10H_2O$.
(B) An aqueous solution of 5% $Na_2B_4O_7 \cdot 10H_2O$, and 0.5% Nissan Cation BB.
(C) An aqueous solution of 5% $Na_2B_4O_7 \cdot 10H_2O$, urea and 0.5% Nissan Cation BB.
(D) An aqueous solution of 5% $Na_2B_4O_7 \cdot 10H_2O$, 4% urea and 0.5% Nissan Cation BB.

TABLE 2

| Treating liquid No.: | Waterproofness | Offset printability |
|---|---|---|
| A (for comparison) | 2.5 | Passable |
| B (for comparison) | 3.5 | Good. |
| C (this invention) | 4 | Excellent. |
| D (this invention) | 4 | Do. |
| Water treatment only | 1.5 | Good. |

From the data set forth in Table 2, it is apparent that the treatment with one of the treating liquids containing a compound with amino groups, e.g., urea and a surface active agent, e.g., Nissan Cation BB dispersed in the borax solution improved the waterproofness and the offset printability far more effectively for the coated paper prepared even by the use of partially saponified PVA. Moreover, the use of the treating liquids C and D completely prevented the coated surface from sticking to a calender roll.

EXAMPLE 3

Coating and treatment of the paper was performed under the same experimental conditions as in Example 1 except by the use of the following treating solutions: (I) The box in solutions C, D, E and F of Example 1 was replaced by boric acid. (II) The surface active agent, Nissan Cation BB, in solutions C, D, E and F in Example 1, was replaced by Epan 485 (a surface active agent marketed by Dai-ichi Kogyo Seiyaku Co. Ltd.), and (III). Epan 485 is a nonionic surface active agent of high molecular weight, about 8000, in which polypropylene glycol is used as a hydrophobic group and polyethylene glycol as a hydrophilic group and has the general structural formula:

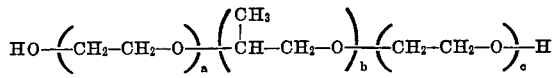

wherein $a+c$ is about 85 weight percent and $b$ is about 15 weight percent. The surface active agent in solutions C, D, E and F of Example I was replaced by Igepon T having a structural formula

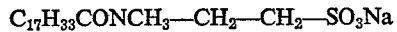

(an anion surface active agent marketed by I. G. Farben Industries). As a result, it was possible by this method to produce a coated grade with increased waterproofness and offset printability over that obtainable with the treatment or borax alone.

EXAMPLE 4

Coating and treatment of the paper is performed under the same experimental conditions as in Example 1, using three treating solutions identical to solution C except that triethanolamine, hexamethylenediamine, ethyldiamine, and dipropylamine, respectively, are substituted for the ethylenediamine.

The embodiments of the invention in which an exclusive property or privilege is claimed are defined as follows:

1. A process for producing a coated paper having improved water resistance and superior printability characterized by treating the coated surface of a paper coated with a color composition containing as the principal constituents a pigment and a polyvinyl alcohol with a solution consisting essentially of a boric compound having an electron-accepting structure selected from the group consisting of boric acid and boric salts, a water-soluble amino compound having at least one amino group selected from the group consisting of primary, secondary, and tertiary amino groups in its molecule, an electron donating structure and a boiling point in excess of about 100° C., provided in an amount with respect to the boric compound sufficient to effect a coordination bonding therewith, and a surface active agent which reduces the surface tension of the treating solution, said paper being treated with said solution in an amount effective to improve the water resistance and printability thereof, and thereafter drying the coated paper.

2. The process of claim 1 wherein the amino-compound is an amine.

3. The process of claim 2 wherein the amino compound is selected from the group consisting of mono-, di- and tri-amines of the formula $(R)_3N$ where 1 to 2 R's are hydrogen and 1 to 3 R's are selected from the group consisting of alkyl and alkoxy.

4. The process of claim 1 wherein the amino compound is a lower alkylene diamine.

5. The process of claim 4 wherein the amino compound is ethylenediamine.

6. The process of claim 1 wherein the amino compound is urea.

7. The process of claim 1 wherein the amino compound is hexamethylenetetramine.

8. The process of claim 1 wherein the amino compound is dicyandiamide.

9. The process of claim 1 wherein the boric compound is borax.

10. A process for producing a coated paper having improved water resistance and superior printability characterized by treating the coated surface of a paper coated with a color composition containing as the principal constituents a pigment and a polyvinyl alcohol with a solution consisting essentially of a boric compound having an electron-accepting structure selected from the group consisting of boric acid and boric salts, about 1 to 10 parts by weight for each 5 parts by weight of boric compound of a water-soluble amino compound having at least one amino group selected from the group consisting of primary, secondary, and tertiary amino groups in its molecule, an electron donating structure and a boiling point in excess of about 100° C., and about 0.001 to 1 part by weight for each 5 parts by weight of boric compound of a surface active agent which reduces the surface tension of the treating solution, said paper being treated with said solution in an amount effective to improve the water resistance and printability thereof, and thereafter drying the coated paper.

References Cited
UNITED STATES PATENTS

| | | | |
|---|---|---|---|
| 2,579,481 | 12/1951 | Fenn | 117—161X |
| 2,579,483 | 12/1951 | Fenn | 117—161X |
| 2,760,942 | 8/1956 | Oakley | 117—161X |
| 2,919,205 | 12/1959 | Hart | 117—155X |
| 3,218,191 | 11/1965 | Domanski | 117—155X |
| 3,409,434 | 11/1968 | Landberge et al. | 117—161X |
| 3,438,808 | 4/1969 | Hawkins et al. | 117—155 |
| 3,476,582 | 11/1969 | Inoto et al. | 117—62.2 |
| 3,481,764 | 12/1969 | Matsamoto et al. | 117—62.2 |

WILLIAM D. MARTIN, Primary Examiner

M. R. LUSIGNAN, Assistant Examiner

U.S. Cl. X.R.

117—62.1, 62.2, 155